May 31, 1960

E. M. MACDONALD 2,938,654

ZONE IDENTIFICATION CHECK DISPENSER

Filed Aug. 26, 1958

INVENTOR.
EUGENE M. MacDONALD
BY Golrick & Golrick
ATTORNEYS

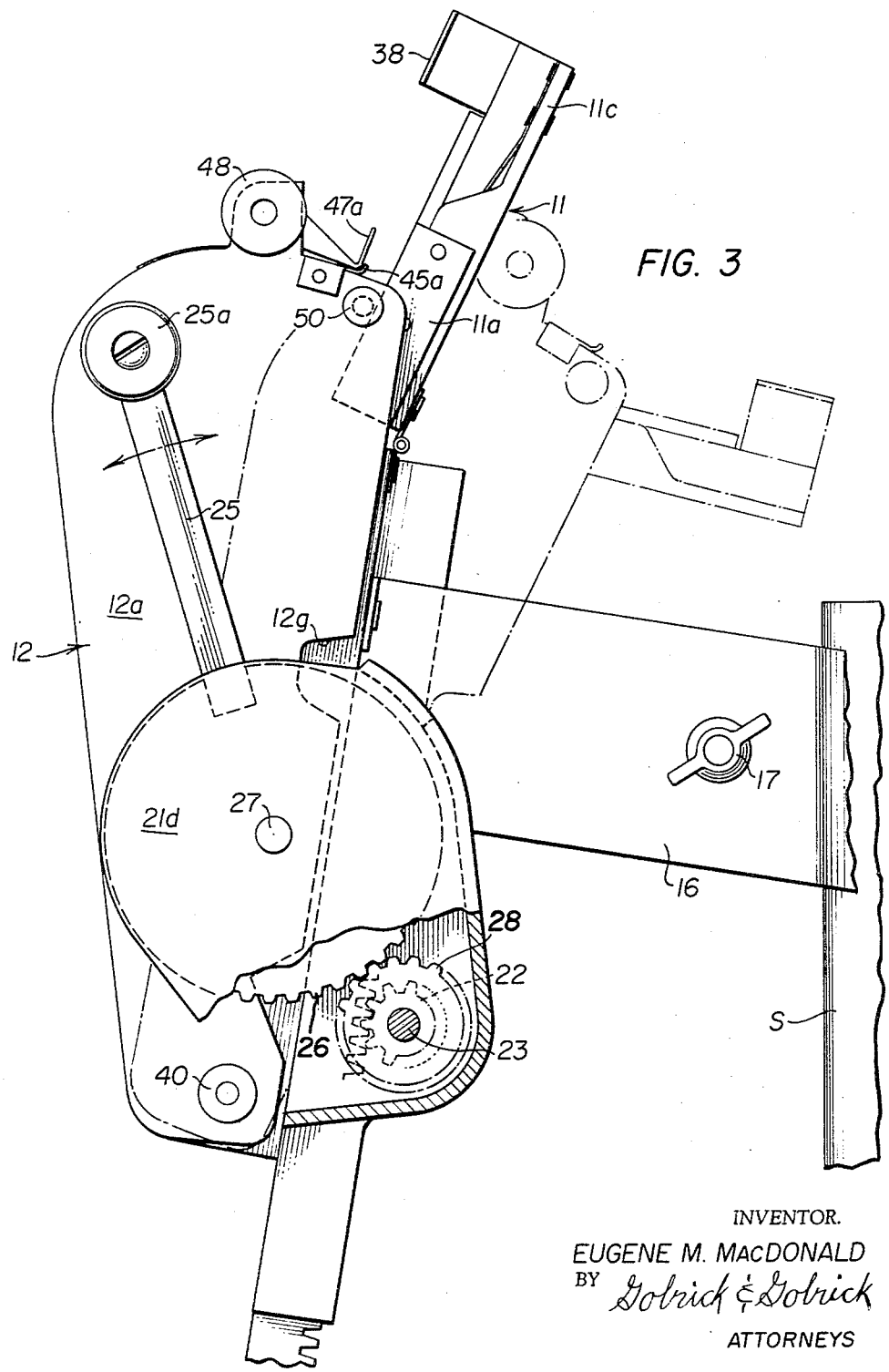

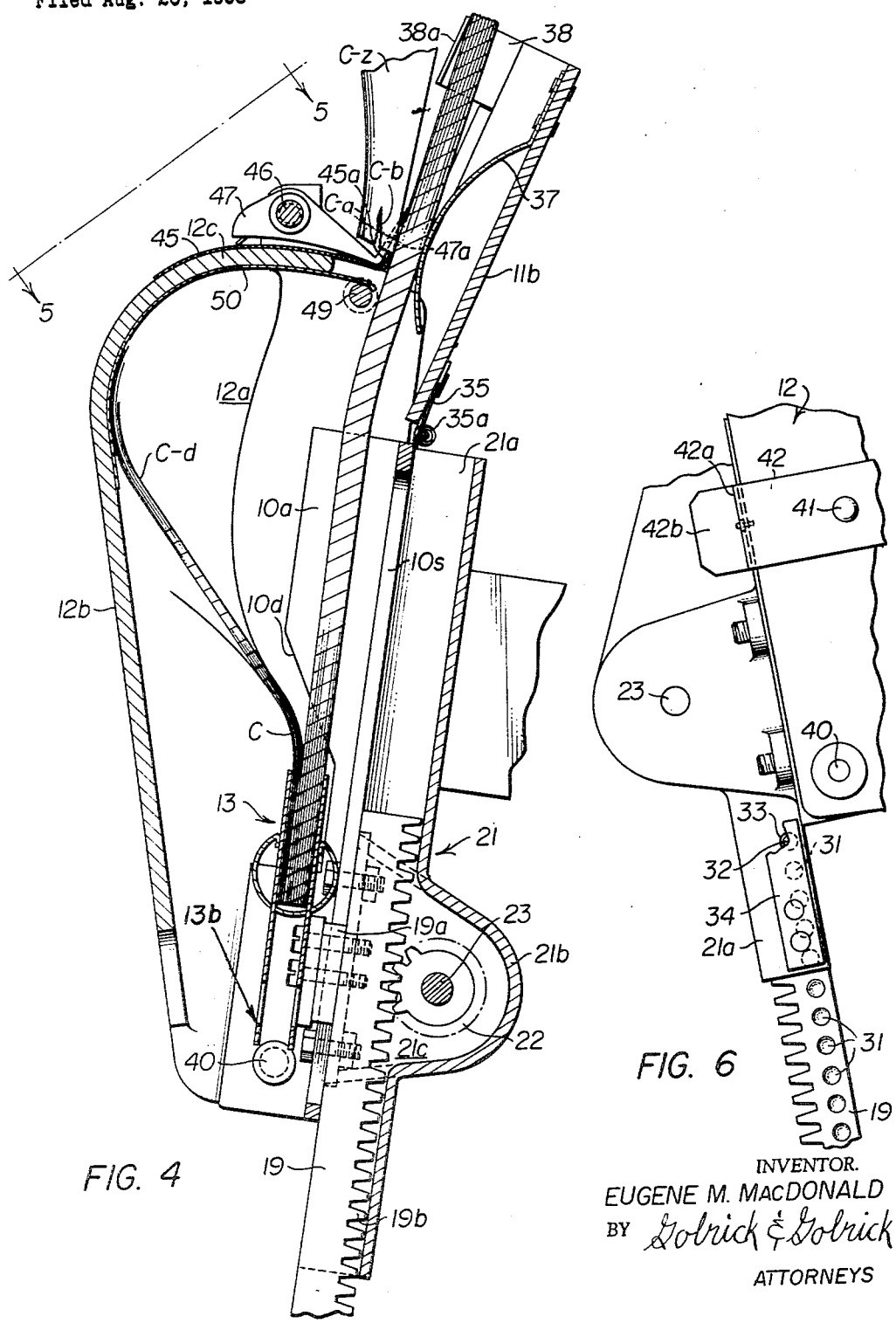

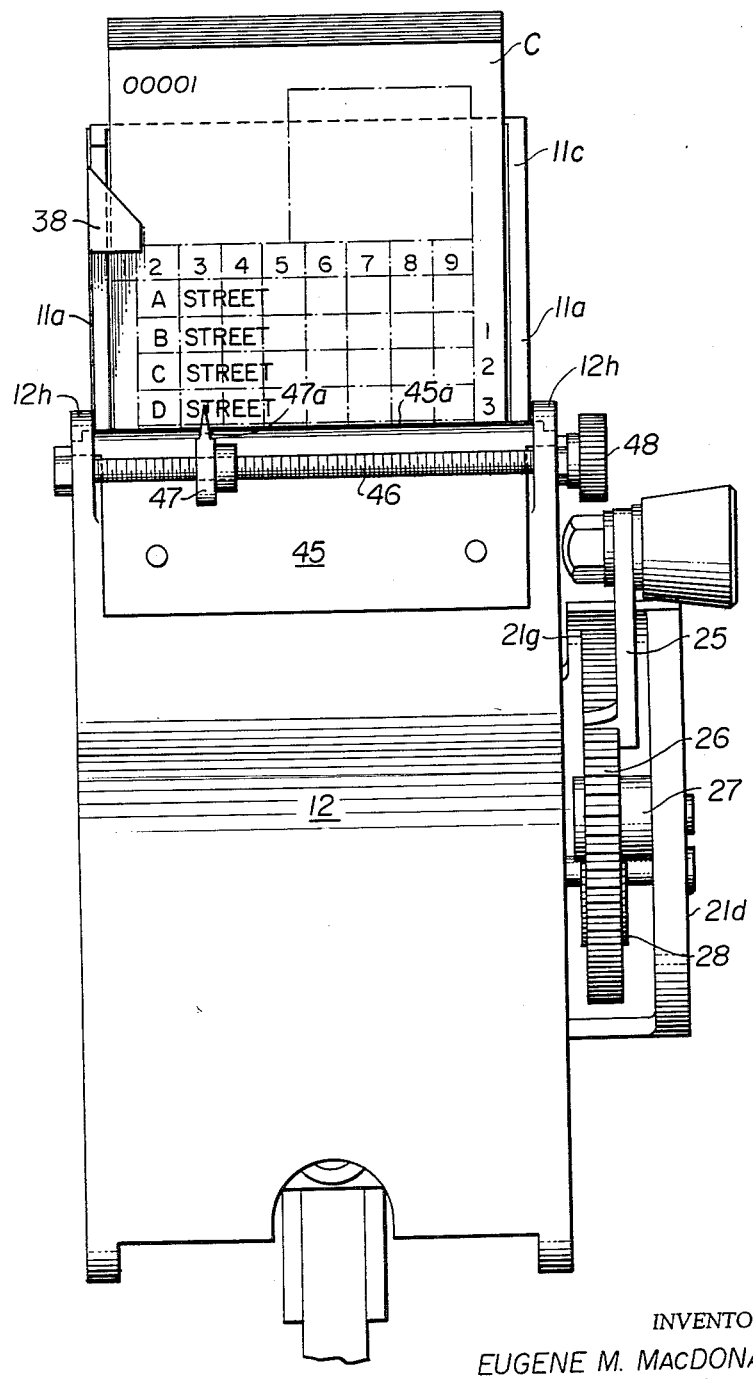

United States Patent Office 2,938,654
Patented May 31, 1960

2,938,654
ZONE IDENTIFICATION CHECK DISPENSER
Eugene M. Macdonald, University Heights, Ohio, assignor to Rosemary Elizabeth Macdonald, University Heights, Ohio Filed Aug. 26, 1958, Ser. No. 757,307
5 Claims. (Cl. 225—23)

The present invention is concerned generally with a dispenser for so-called zone identification checks or for like pieces of printed matter which are to be torn individually from a pad at varying longitudinal locations to provide a detached portion and a complementary stub portion retained in the dispenser.

More particularly, the present invention is concerned with improvements in the structure of a dispenser having the general character disclosed in the Macdonald patent, U.S. Patent Number 1,797,270. Principally and specifically the present invention is concerned with providing a dispenser which is quickly and accurately set for the proper location of the tear-off line of each check whereby a series of checks may be conveniently and rapidly issued even though each requires a different location of the torn edge. For convenience of discussion, the present invention will be described in terms of a zone identification check to be dispensed, although useful for other items of similar form.

Certain public transportation companies, charging fares which vary according to the points between which or zones through which a passenger rides, require a vehicle operator to issue to each boarding passenger, a check or slip identifying the passenger by the respective fare paid. Such checks are herein called zone identification checks whether used for a point-to-point or zone fare system. In a typical practice, a vehicle operator is provided with a pad of like elongated printed checks pertinent to the vehicle route, each of which bears a series of transversely printed zone or stop identification indicia such as numbers, or names corresponding respectively to the successive transportation fare zones, or stop numbers or streets along the route of the vehicle. Also, vertical or longitudinal columns are usually marked off in consecutively numbered correspondence to the successive transverse indicia. As each fare is paid the operator tears a check for issuance transversely from the pad at a location indicating the zone or stop to which fare has been paid including some further marking in the vertical columns where used, to indicate the boarding point.

For such purposes, in prior dispensing devices such as that set forth in the aforementioned Macdonald patent, a pad of zone checks is shifted longitudinally relative to a transverse tear-off guide for each check issued on a fare paid to a different point from that of a preceding check. For example in the said Macdonald patent the shift is effected by manipulation of a pad shifting screw element. This is, however, relatively cumbersome and time consuming, since several passengers often board at one stop paying fares to several different zones or stops. Hence it is highly desirable that the operator be able to issue such identification checks rapidly and correctly.

It is, therefore, the principal object of the present invention to provide means for rapidly and accurately shifting a zone check identification pad relatively to a tear-off guide edge. This is achieved according to the present invention by providing the dispenser with conveniently accessible operating lever which, by movement through its full stroke say from an extreme upward to an extreme downward position, carries a check pad through its full length relative to a transverse tear-off guide edge; and also by the preferred inclusion of longitudinal indexing means such as a spring-urged detent ball or pin device between a fixed element and an element movable with the pad carrier, whereby the pad is readily located at a series of individual positions corresponding to distinct tear-off portions or regions of the pad. Another object of the invention is the provision of means whereby a pad is quickly inserted into a dispenser of the type here in question, and readily located after insertion relative to the range of operation of the detent mechanism; and further, whereby the pad may be quickly adjusted, as may be required when the printed indicia pattern "drifts" relative to the pad length as the pad is used. Other objects and advantages of the invention will appear from the following description and the drawings, wherein:

Fig. 3 is a right side elevation, with certain portions broken away;

Fig. 4 is a generally vertical longitudinal section taken substantially along the line 4—4 of Fig. 1;

Fig. 5 is an enlarged oblique view taken approximately as indicated by line 5—5 in Fig. 4; and Fig. 6 is a detail view of an indexing detent structure and a cover latch on the left side of the dispenser.

Figures 1, 2:
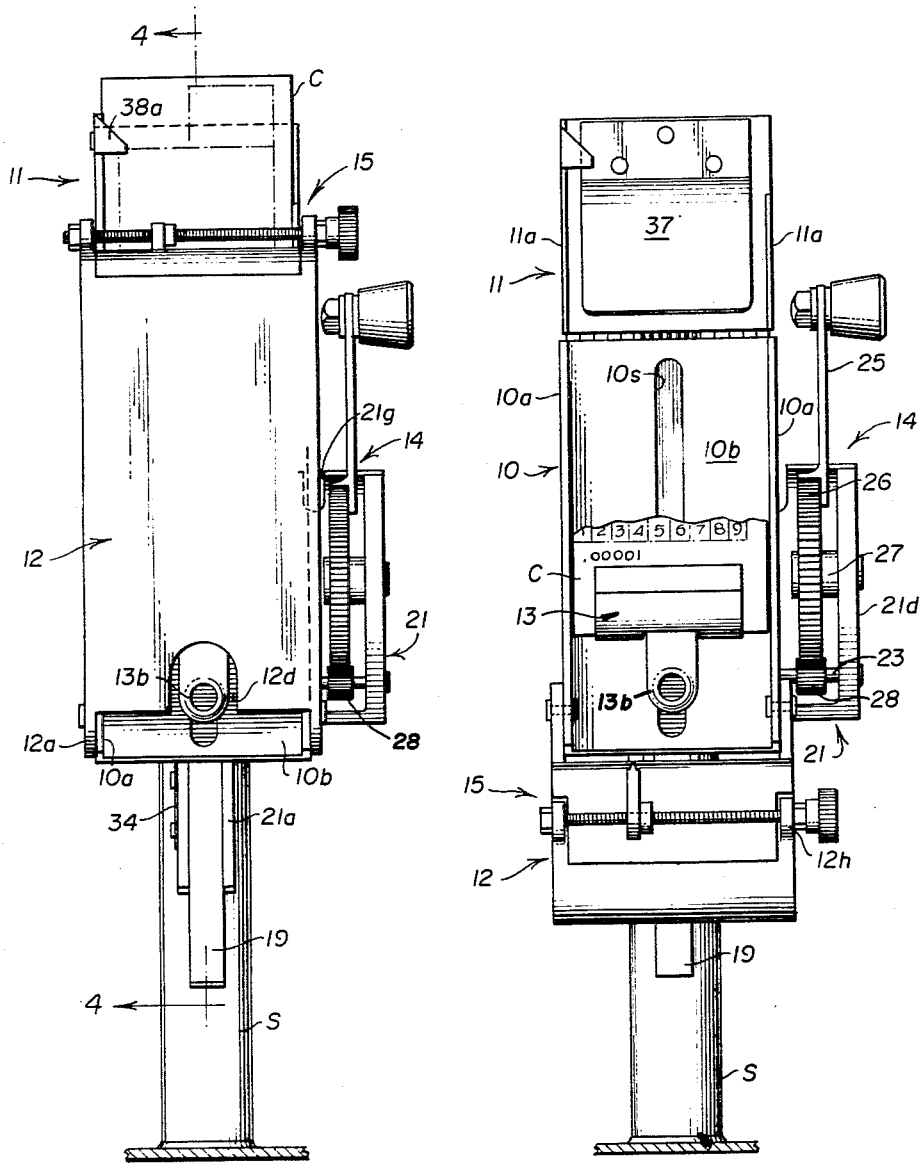
Fig. 1 is a front elevation of a zone identification check dispenser embodying the present invention.
Fig. 2 is similar to Fig. 1 with the cover structure open.

The general structure of the present zone identification check dispenser, shown in the drawings as mounted on a stanchion or vertical post, and best seen in Figs. 1, 2, and 3, comprises a casing including a base member 10; a hinged base extension member 11 and a hinged cover 12, at the top and bottom of the base respectively; a releasable vertically movable carrier for a pad C of zone identification checks including a pad clamp 13 and a lever operating mechanism 14 therefor; and a check tear-off guide and indicating assembly 15.

The base 10, a broad shallow channel member, which may be an extruded or cast metal piece providing a flat back section 10b and forwardly extending parallel edge flanges 10a, is supported in vertically and rotationally adjusted position by a clamp formed by two like spaced resilient strap or plate elements 16, rigidly secured to and extending rearwardly from the back of 10b to embrace the stanchion S in clamping relation by virtue of a clamping screw and wing nut 17.

To present successive individual checks of the pad C to the tear-off assembly at selected vertical position for purposes hereinafter explained, the bottom or stapled end of the pad is releasably engaged in a spring clip 13, of known form with one leaf thereof bolted to the flat front face of an integral lug 19a projecting through a vertical central base slot 10s from a square slide rod element 19 movable in a correspondingly shaped slideway 21a formed as an integral part of a pad carrier actuator housing 21.

The housing 21 may be a hollow metal casting, including a main body portion 21b removably secured to the back of base portion 10b by bolts or screws, and having upwardly and downwardly projecting forwardly open extensions of square cross-section aligned with slot 10s to form guideway 21a. The back of slide 19 has a rack formation 19b, engaged by a pinion 22 secured to a shaft 23 with ends journalled in opposite side walls 21c, 21d of the housing 21. To afford convenient lever operation and positioning of the pad, the rack and pinion mechanism is operated by a hand lever 25 secured to a large gear 26 rotatably secured by a stud structure 27 on right wall 21d and meshed with a smaller gear 28 secured on shaft 23 as a motion multiplying connection. To this end the ratio of diameters of 28, 22, 26 may be on the order of say 2 to 1 to 6 for the arrangement shown in the drawings. Accordingly the projecting right end of housing 21 is enlarged and shaped to enclose gears 26, 28 on the right side, back and bottom, while providing clearance for the lever 25 which is swingable in a plane to the right of and parallel to the dispenser casing as shown. The stud 27 is set forwardly of shaft 23 to render the entire structure more compact.

The left side of the rack-formed slide element 19 is provided with a longitudinal series of depressions 31, equally spaced to correspond with desired increments in vertical positioning as required by the printed form of the pad, each depression being engageable successively by a hardened ball or short detent pin 32 in the left side wall aperture 33 of slideway 21a. The top free end of flat spring 34 with bottom end riveted to 21a bears on the outer end of the ball to urge it into a detent engagement with depressions 31. The base flanges 10a have like opposite cut-outs 10d at a locus above the bottommost position of clip 13, to permit more ready manipulation of a pad particularly in removing an exhausted pad.

The extension 11, again a shallow channel structure of width like to that of 10 and having side flanges 11a aligned with 10a, is secured to the top of 10 by hinge means 35 including a spring 35a biasing 11 upwardly into general alignment with 10. A pad backing spring plate 37 (see Fig. 4) is riveted along its straight top edge to the top or back portion 11b, the spring 37 being bent outwardly away from 11b to press against the pad back. At the top of the left flange of the extension there is secured a stamped metal check pad retainer 38 with outer end 38a bent inwardly over the back of the extension to keep the free upper ends of the top or uppermost, untorn, unused checks from falling forwardly over assembly 15. The right flange near its upper end is cut away at 11c for convenient hand access to the pad for tearing or other manipulations.

The cover 12, conveniently a hollow casting or the like, of form apparent from the drawings, has straight downwardly narrowing sides integral with a joining web or front portion 12b which is flat over its major length from the bottom toward the top where it curves over into an end region 12c. The bottom of the cover is open endwise, and at the bottom is hinged to the base with side flanges 12a lying outside of and parallel to respective base flanges 10a by respective pivot rivets or screws 40 through the bottom end regions of respective corresponding adjacent flanges. It will be noted also that the upper end of the cover extends above and beyond the hinge structure 35.

The bottom edge of the cover front portion is upwardly notched at 12d for finger access to the clip release handle or tab 13b (see Fig. 1) when the cover is closed. On the outer side of the left flange of the cover there is riveted at 41 the forward end of a spring 42, formed of flat spring strip stock, to extend inwardly beyond the flange for engaging the back side margin of 10. Spring 42 serves as a cover lock preventing the same from coming open, the spring having a tab 42b for convenience in pulling the spring outwardly to the left for releasing the cover forwardly. A short rearwardly projecting catch pin or projection in the member 10, engageable in an oversized aperture in the inwardly extending part 42a is useful in ensuring against accidental opening during use. Preferably the top margin of the housing 21 is notched at 21g, and the back free edge of the right cover flange co-operatively notched at 12g to permit a greater hinging swing of the cover toward the base as later detailed.

The tear-off assembly includes a transverse tear-off guide 45, here in the form of a metal plate secured to the top end of the cover and shaped to conform thereto and to provide an upwardly turned relatively sharp straight transverse tearing edge at 45a, across the face of the pad. A pair of lugs ears 12h, in effect upward extensions of respective side flanges 12a, support a transverse rod 46, disposed parallel to edge 45a, along which there is movably mounted a carrier 47 for a cutter point 47a, adjustable in transverse position relative to edge 45a and projecting thereabove in proximity to the pad. Here carrier 47 and rod 46 take the form respectively of a nut, and of a screw element journalled at opposite ends in lugs 12h for rotation by a knob 48, whereby the position of 47a is set. Accordingly with the device in set position ready for tearing of a check as in Fig. 4, when the operator tears off a check as at C–2, not only is the edge torn generally straight at the desired locus, C–a but also a notch as at C–b is formed in the torn edge of the removed check, leaving at the same time a corresponding projection on the remaining stub edge.

Also a transverse round bar or roll 49 with ends rotatably journaled in side flanges 12a is carried near the top of cover 12 in a position adjacent to the front of a full pad; and here there is also shown a curved liner plate 50 secured to the inside of the upper end of the cover to present a smooth surface to check stub ends in the operations later described. The flanges 11a of the hinged extension 11 preferably are covered by formed sheet metal sheaths secured thereon to provide smooth, straight, wear-resistant bearing surfaces engaged by bar 49 in operation of the dispenser. To open the dispenser for inserting or removing a check pad, the cover lock spring is drawn outwardly sideways by tab 42b to release the cover so that the cover can be drawn forwardly to an open position. Where a catch pin, as previously mentioned, is used to engage the spring, the cover must be initially pushed backward slightly to permit the spring to be disengaged. By pressing pad clip handle or tab 13b against the closing force or bias of the clip, the clip jaws are opened for removal or insertion of the stapled end of the pad. When a pad is inserted it is placed in the guideway formed therefor by the side flanges of members 10 and 11, with its upper end under retainer 38 and its lower end gripped by the clip 13.

When the cover is closed, with lock spring 42 engaged behind base 10, forward movement of the cover is inhibited, but the cover may be manually pushed backward, that is toward the base 10 to the position indicated in dashed outline in Fig. 3. Thereafter the lever 25 is swung upwardly to an extreme vertical position to bring the pad carrier to lowermost position, and therefore clip tab 13b to a position accessible through cover notch 12d; and with tab 13b manually depressed to permit movement of the pad, the pad is adjusted in position angularly so that transverse rulings of the checks are parallel to the cut-off edge 45a, and vertically so that the uppermost line of zone or stop identification printing is just above the edge 45. The pad is then ready for use.

Thereafter when the operator is to issue checks the pointer or cutter 47a is moved transversely to a column corresponding to the pick-up stop for which boarding passengers will be issued checks. Then as a fare is paid at a given pick-up point, to issue a check the operator swings the lever 25 downward to bring above the guide edge 45a the transverse indicia of the stop to which the corresponding fare has been paid; and simply tears off the check for the passenger. The bottom-most printing along the transversely torn edge indicates the stop or zone which fare has been paid; while the indentation formed by the pointer 47a indicates the boarding point. The complementary form of the stub remaining in the pad preserves like information for audit purposes. When a check is torn off, the hinged cover is pushed manually back toward the base member 10, folding extension 11 backward by pressure of the roll 49 on the flanges 11a, to the dashed position of elements in Fig. 3, and then released to spring back to normal position by virtue of the force of the spring 35a acting to restore extension 11 to normal position. As the roll moves upward over the pad (which is thereby flexed rearwardly) and beyond the top edge of the last-torn check stub, the latter springs up and escapes behind the roll, so that on the return motion of the cover to normal position the used stubs are entirely within the cover, and a fresh stub is presented to the tear-off assembly.

Thus at any stop, where a group of passengers may board, the checks are quickly issued in correct form, since the operator may have the pointer 47a already set when he arrives at the stop, and the setting for each successive check is quickly accomplished by a setting of the lever 25, facilitated by the detent locating device for the rack, tearing off the check and the pushing of the cover before setting of the lever for the next check.

I claim:

1. A zone identification check dispenser or the like adapted to receive and support a pad of checks, and present successive checks to tear-off guiding edges whereby a selected portion of each check may be torn off from a complementary retained stub portion, comprising: a housing including a base member and providing a guideway on which an elongated pad may be mounted for longitudinal movement, and also including an externally visible cut-off guide edge member located adjacent said guideway in proximity to and tranverse to a pad disposed therein; and a rapidly adjustable mechanism for setting the pad in longitudinal position relative to said cut-off edge including a pad carrier within said guideway for releasably engaging a bound bottom end of a pad, a longitudinal slideway on said base member, a slide in said slideway mounting said carrier on one side thereof, a lever pivoted to the base member to swing in a plane parallel to and outboard of one side of said base member, and a motion multiplying connection between said lever and said slide whereby said pad may be moved over a required range of longitudinal excursion by movement of said lever.

2. A dispenser as set forth in claim 1 wherein a longitudinal position indexing device is provided between said slide and slideway for locating the slide precisely at selected increments of positions.

3. A zone identification check dispenser or the like adapted to receive and support a pad of checks, and present successive checks to tear-off guiding edges whereby a selected portion of each check may be torn off from a complementary retained stub portion, comprising: a housing including a base member and providing a guideway in which an elongated pad may be mounted for longitudinal movement and also including a cut-off guide edge member mounted adjacent said guideway in proximity to and transverse to a pad disposed therein; and a rapidly adjustable mechanism for setting the pad in longitudinal position relative to said cut-off edge including a pad carrier within said guideway for engaging a bound bottom end of a pad, a longitudinal slideway on said base member, a slide in said slideway mounting said carrier on one side thereof, and having a longitudinal rack formation on another side thereof, a lever pivoted to the base member to swing in a plane parallel to and outboard of one side of said base member, and a motion multiplying gear train driven by said lever and including a pinion meshing with said rack, whereby said pad may be moved over a required range of longitudinal excursion by movement of said lever through less than 180°.

4. A dispenser as set forth in claim 1 wherein said slide member is provided with a longitudinal series of depressions and said slideway with an element resiliently, yieldably urged into engagement with successive depressions of said series to afford a slide positioning means.

5. A zone identification check dispenser or the like adapted to receive and support a pad of checks, and present successive checks to tear-off guiding edges whereby a selected portion of each check may be torn off from a complementary retained stub portion, comprising: a housing including a base member defining a guideway in which an elongated pad may be mounted for longitudinal movement, a guideway extension hinged to the top of the base member for pivoting about an axis transverse to the length of the guideway, and a cover having side walls lying outside and parallel to the sides of said base, said cover having its bottom pivoted to the bottom of said base member and its top terminating at a middle region of said extension; a cut-off guide edge member carried by the top end of said cover in proximity to and transverse to a pad located in said channel; and a rapidly adjustable mechanism for setting the pad in longitudinal position relative to said cut-off edge including a pad carrier within said guideway, said carrier having a spring-closed hinge clip for releasably engaging a bound bottom end of a pad, a longitudinal slideway on said base member, a slide in said slideway mounting said carrier on one side thereof, a lever pivoted to the base member to swing in plane parallel to and outboard of one side of said base member, and a motion multiplying connection between said lever and slide member whereby said pad may be moved over a required range of longitudinal excursion by movement of said lever; said cover being apertured near its bottom end for finger access to said clip whereby the pad position may be adjusted in said carrier.

References Cited in the file of this patent

UNITED STATES PATENTS 1,941,979   Feddern _____ Jan. 2, 1934